(12) United States Patent
Murata et al.

(10) Patent No.: US 12,228,527 B2
(45) Date of Patent: Feb. 18, 2025

(54) INSPECTION DEVICE (71) Applicant: SAKI CORPORATION, Tokyo (JP)

(72) Inventors: Hiroyuki Murata, Tokyo (JP); Atsushi Kitabatake, Tokyo (JP); Yuichiro Yoshida, Tokyo (JP)

(73) Assignee: SAKI CORPORATION, Tokyo (JP)

( * ) Notice: Subject to any disclaimer, the term of this patent is extended or adjusted under 35 U.S.C. 154(b) by 149 days.

(21) Appl. No.: 17/919,282

(22) PCT Filed: Apr. 1, 2021

(86) PCT No.: PCT/JP2021/014136
§ 371 (c)(1),
(2) Date: Oct. 17, 2022

(87) PCT Pub. No.: WO2021/215217
PCT Pub. Date: Oct. 28, 2021

(65) Prior Publication Data
US 2023/0175985 A1 Jun. 8, 2023

(30) Foreign Application Priority Data
Apr. 22, 2020 (JP) ................. 2020-075927

(51) Int. Cl.
*G01N 23/044* (2018.01)
*G01N 23/083* (2018.01)
(52) U.S. Cl.
CPC ......... *G01N 23/044* (2018.02); *G01N 23/083* (2013.01); *G01N 2223/33* (2013.01); *G01N 2223/611* (2013.01)

(58) Field of Classification Search
CPC . G01N 23/044; G01N 23/083; G01N 2223/33
See application file for complete search history.

(56) References Cited

U.S. PATENT DOCUMENTS 9,025,855 B1 5/2015 Christoph et al.
2009/0008581 A1 1/2009 Fujiwara et al.
(Continued)

FOREIGN PATENT DOCUMENTS

JP 2006333898 A 12/2006
JP 200826334 A 2/2008
(Continued)

*Primary Examiner* — Chih-Cheng Kao
(74) *Attorney, Agent, or Firm* — HAUPTMAN HAM, LLP (57) ABSTRACT

To provide an inspection device capable of imaging a transmission image while changing relative positions of a radiation source, an inspection object, and a detector. An inspection device comprises a radiation generator, a substrate holding unit for holding an inspection object, a detector, a substrate holding unit driving unit and a detector driving unit, a substrate position detection unit and a detector position detection unit, and a control unit, wherein the control unit executes a step for causing the detector to start acquiring an image while the relative positions of the radiation generator, the substrate holding unit and the detector are changing, a step for acquiring information relating to the positions of the substrate holding unit and the detector when the detector starts acquiring an image, and a step for storing the image acquired by the detector and the information relating to the position in association with each other.

4 Claims, 5 Drawing Sheets (56) References Cited

U.S. PATENT DOCUMENTS

| 2017/0215821 A1* | 8/2017 | Öjelund | A61B 6/4233 |
| 2018/0252656 A1* | 9/2018 | Kambe | G01N 23/043 |
| 2019/0246999 A1* | 8/2019 | Liu | A61B 6/487 |

FOREIGN PATENT DOCUMENTS

| JP | 2009128056 A | 6/2009 |
| JP | 201361257 A | 4/2013 |
| WO | 2013039032 A1 | 3/2013 |
| WO | 2018002281 A2 | 1/2018 |

* cited by examiner

INSPECTION DEVICE

TECHNICAL FIELD

The present invention relates to an inspection device.

BACKGROUND ART

As an inspection device for measuring a solder shape on a front surface or a back surface of a substrate, there is a tomosynthesis X-ray inspection device (see Patent Literature 1).

CITATION LIST

Patent Literature

Patent Literature 1: Japanese Patent Application Laid-Open No. 2008-026334

SUMMARY OF INVENTION

Technical Problem

Such inspection device is configured to capture a plurality of transmission images while changing the relative positions of the radiation source (radiation generator), the inspection object, and the detector, and to generate a reconstructed image from the transmission images. In such an inspection device, the transmission image is generally acquired by stopping the inspection object and the detector each time imaging is performed. However, there are problems in that a moving time and a stationary time are wasted and vibration occurs during acceleration and deceleration.

The present invention has been made in view of such a problem, and an object of the present invention is to provide an inspection device capable of capturing a transmission image while changing a relative position between a radiation source and an inspection object and a detector.

Solution to Problem

In order to solve the aforementioned problem, an inspection device comprises: a radiation source; a holding unit for holding an inspection object; a detector for detecting radiation from the radiation source that has passed through the inspection object and acquiring an image of the inspection object; a driving unit for changing the relative positions of the radiation source, the holding unit and the detector; a position detection unit for detecting information relating to the positions of the holding unit and the detector; and a control unit, wherein the control unit executes: a step for causing the detector to start acquiring the image; a step for acquiring information relating to the positions of the holding unit and the detector from the position detection unit when the detector starts acquiring the image; and a step for storing the image acquired by the detector and the information relating to the position in association with each other; while the relative positions of the radiation source, the holding unit and the detector are changed by the driving unit.

An inspection device comprises: a radiation source; a holding unit for holding an inspection object; a detector for detecting radiation from the radiation source that has passed through the inspection object and acquiring an image of the inspection object; a driving unit for changing the relative positions of the radiation source, the holding unit, and the detector; and a control unit, wherein the control unit causes the detector to start acquiring the image while the relative positions of the radiation source, the holding unit, and the detector are being changed by the driving unit, and the detector causes the radiation source to emit the radiation during at least a part of a predetermined period during which the image is being acquired.

An inspection device according to the present invention comprises a radiation source; a holding unit for holding an inspection object; a detector for detecting radiation from the radiation source that has passed through the inspection object and acquiring an image of the inspection object; a driving unit for changing the relative positions of the radiation source, the holding unit, and the detector; a position detection unit for detecting information relating to the positions of the holding unit and the detector; and a control unit, wherein the control unit executes: a step for causing the detector to start acquiring the image; a step for acquiring information relating to the positions of the holding unit and the detector from the position detection unit when the detector starts acquiring the image; and a step for storing the image acquired by the detector and the information relating to the position in association with each other; while the relative positions of the radiation source, the holding unit, and the detector are being changed by the driving unit, and the detector causes the radiation source to emit the radiation during at least part of a predetermined period during which the image is being acquired.

Advantageous Effects of Invention

With the inspection device according to the present invention, it is possible to capture transmission images while changing the relative positions of the radiation source, the inspection object, and the detector.

BRIEF DESCRIPTION OF DRAWINGS

FIG. 5 is an explanatory diagram for explaining the movement of the substrate holding unit and the detector, and the timing of X-ray emission from the radiation generator and imaging by the detector.

DESCRIPTION OF EMBODIMENTS

Figure 1:
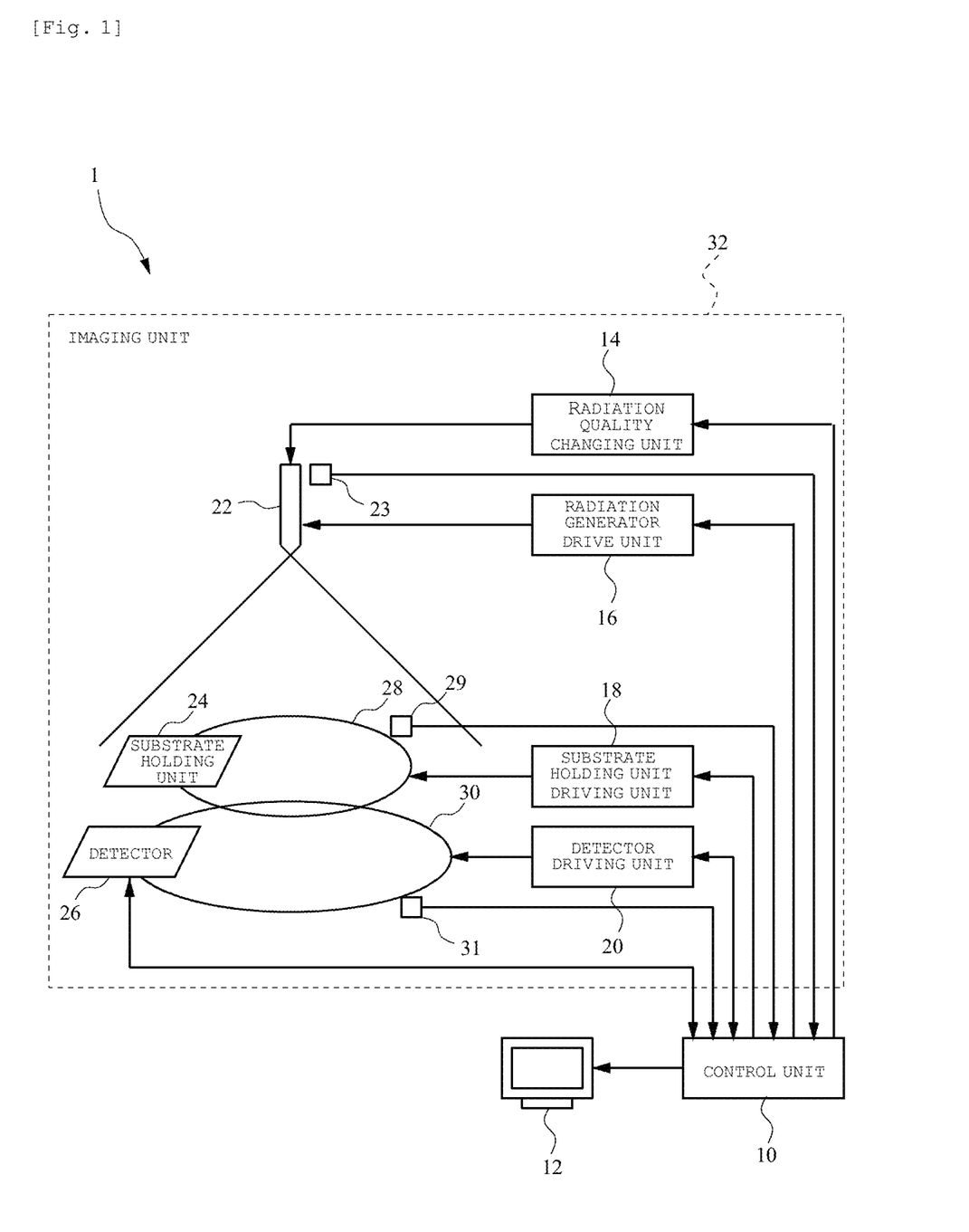
FIG. 1 is an explanatory diagram for explaining a configuration of an inspection device according to an embodiment.

Preferred embodiments of the invention will now be described with reference to the drawings. As shown in FIG. 1, the inspection device 1 according to the present embodiment includes a control unit 10 configured by a processing device such as a personal computer (PC), a monitor 12, and an imaging unit 32. The imaging unit 32 further includes a radiation quality changing unit 14, a radiation generator driving unit 16, a substrate holding unit driving unit 18, a detector driving unit 20, a radiation generator 22, a substrate holding unit 24, and a detector 26.

The radiation generator 22 is a device (radiation source) that generates radiation such as X-rays, and generates radiation by causing accelerated electrons to collide with a target such as tungsten or diamond, for example. The radiation in this embodiment will be described in the case of X-rays, but is not limited thereto. For example, the radiation may be alpha radiation, beta radiation, gamma radiation, ultraviolet radiation, visible radiation, or infrared radiation. The radiation may be a microwave or a terahertz wave.

The substrate holding unit 24 holds a substrate which is an inspection object. A substrate held by a substrate holding unit 24 is irradiated with radiation generated by a radiation generator 22, and the radiation transmitted through the substrate is imaged as an image by a detector 26. Hereinafter, the radiation transmission image of the substrate imaged by the detector 26 is referred to as a "transmission image". As will be described later, in the present embodiment, the substrate holding unit 24 holding the substrate and the detector 26 are moved relative to the radiation generator 22 to acquire a plurality of transmission images, thereby generating a reconstructed image.

The transmission image captured by the detector 26 is sent to the control unit 10 and reconstructed into an image including the three-dimensional shape of the solder of the joint portion using a known technique such as a filtered-backprojection method (FBP method). The reconstructed image and the transmission image are stored in a storage in the control unit 10 or an external storage (not illustrated). Hereinafter, an image reconstructed into a three-dimensional image including the three dimensional shape of the solder of the joint portion based on the transmission image is referred to as a "reconstructed image". An image obtained by cutting out an arbitrary cross section from the reconstructed image is referred to as a "cross-sectional image". Such reconstructed images and cross-sectional images are output to the monitor 12. The monitor 12 displays not only the reconstructed image and the cross-sectional image, but also an inspection result of a bonding state of solder, which will be described later, and the like. The reconstructed image in the present embodiment is also referred to as "planar CT" because it is reconstructed from a planar image captured by the detector 26 as described above.

The radiation quality changing unit 14 changes the radiation quality of the radiation generated by the radiation generator 22. The radiation quality of radiation is determined by a voltage (hereinafter referred to as a "tube voltage") applied to accelerate electrons to collide with a target, and a current (hereinafter referred to as a "tube current") that determines the number of electrons. The radiation quality changing unit 14 is a device that controls the tube voltage and the tube current. The radiation quality changing unit 14 can be realized by using a known technique such as a transformer or a rectifier.

Here, the radiation quality of the radiation is determined by the brightness and hardness of the radiation (spectral distribution of the radiation). When the tube current is increased, the number of electrons colliding with the target increases, and the number of photons of radiation generated also increases. As a result, the brightness of the radiation increases. For example, some components such as capacitors are thicker than other components, and it is necessary to irradiate high-intensity radiation in order to capture a transmission image of these components. In such a case, the luminance of the radiation is adjusted by adjusting the tube current. Further, when the tube voltage is increased, the energy of the electrons colliding with the target increases, and the energy (spectrum) of the generated radiation increases. In general, as the energy of radiation increases, the penetration force of a substance increases and the radiation is less likely to be absorbed by the substance. A transmission image captured using such radiation has a low contrast. Therefore, the tube voltage can be used to adjust the contrast of the transmission image.

The radiation generator driving unit 16 has a driving mechanism such as a motor (not shown), and can move the radiation generator 22 up and down along an axis passing through the focal point thereof (the direction of this axis is referred to as "Z-axis direction"). This makes it possible to change the irradiation field by changing the distance between the radiation generator 22 and the inspection object (substrate) held by the substrate holding unit 24, and to change the magnification ratio of the transmission image captured by the detector 26. The position of the radiation generator 22 in the Z-axis direction is detected by a generator position detection unit 23 and output to the control unit 10.

The detector driving unit 20 also has a drive mechanism such as a motor (not shown), and rotationally moves the detector 26 along a detector rotation trajectory 30. The substrate holding unit driving unit 18 also has a driving mechanism such as a motor (not shown), and moves the substrate holding unit 24 in parallel on the plane on which the substrate rotation trajectory 28 is provided. Further, the substrate holding unit 24 is configured to rotationally move on the substrate rotation trajectory 28 in conjunction with the rotational movement of the detector 26. This makes it possible to capture a plurality of transmission images having different projection directions and projection angles while changing the relative positional relationship between the radiation generator 22 and the substrate held by the substrate holding unit 24.

Here, the rotation radius of the substrate rotation trajectory 28 and the detector rotation trajectory 30 is not fixed, but can be freely changed. This makes it possible to arbitrarily change the irradiation angle of the radiation with which the component disposed on the substrate is irradiated. It should be noted that the track surfaces of the substrate rotation trajectory 28 and the detector rotation trajectory 30 are perpendicular to the above-described Z-axis direction, and that the directions perpendicular to these track surfaces are defined as the X-axis direction and the Y-axis direction, the positions of the substrate holding unit 24 in the X-axis direction and the Y-axis direction are detected by the substrate position detection unit 29 and output to the control unit 10, and the positions of the detector 26 in the X-axis direction and the Y-axis direction are detected by the detector position detection unit 31 and output to the control unit 10.

The control unit 10 controls all operations of the inspection device 1 described above. Hereinafter, various functions of the control unit 10 will be described with reference to FIG. 2. Although not shown, input devices such as a keyboard and a mouse are connected to the control unit 10.

Figure 2:
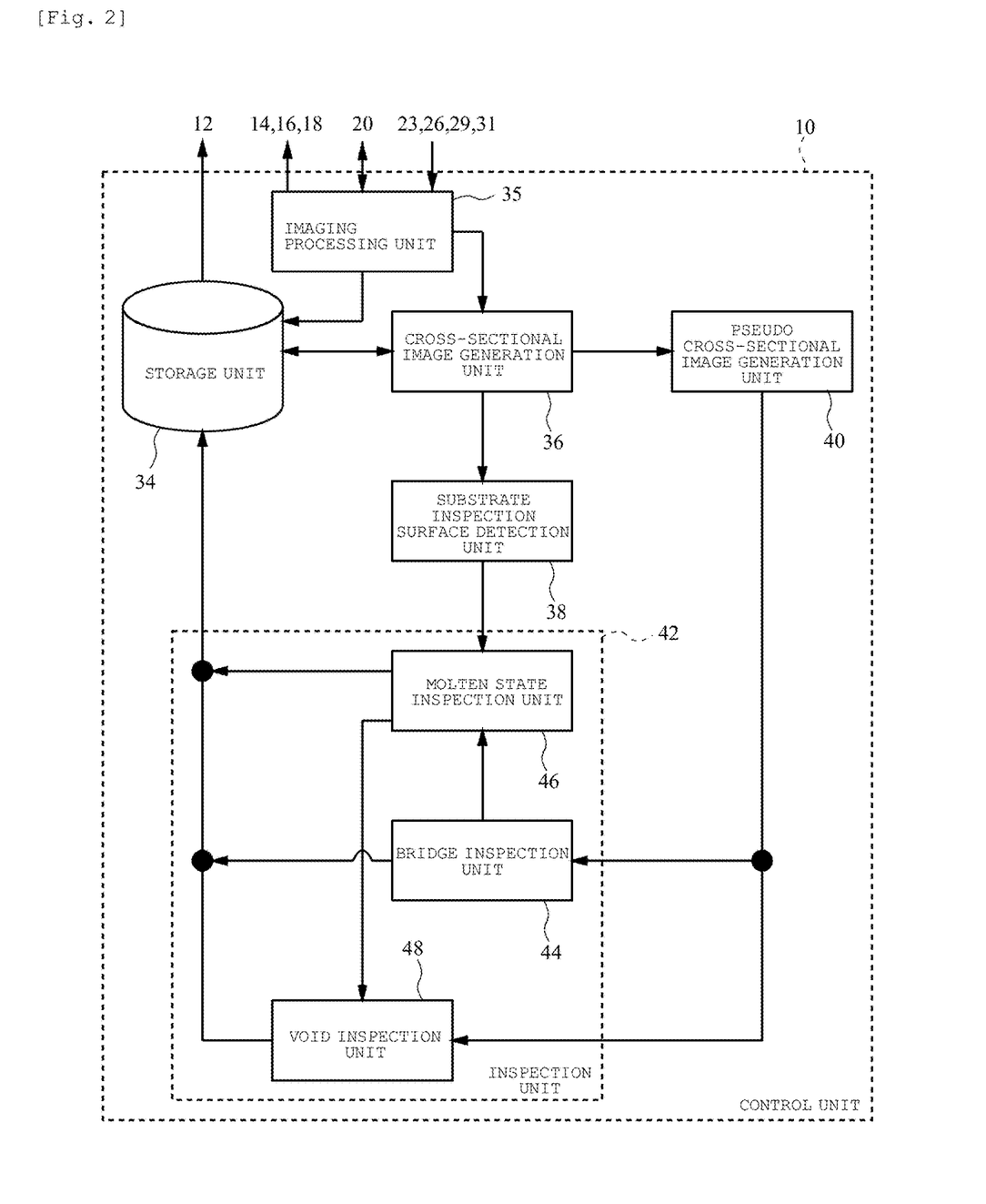
FIG. 2 is an explanatory diagram for explaining functional blocks processed by a control unit of the inspection device.

The control unit 10 includes a storage unit 34, an imaging processing unit 35, a cross-sectional image generation unit 36, a substrate inspection surface detection unit 38, a pseudo cross-sectional image generation unit 40, and an inspection unit 42. Although not illustrated, the control unit 10 also includes an imaging control unit that controls operations of the radiation quality changing unit 14, the radiation generator driving unit 16, the substrate holding unit driving unit 18, and the detector driving unit 20. In addition, each of these functional blocks is realized by cooperation of hardware such as a CPU that executes various arithmetic processing and a RAM that is used as a work area for storing data and executing programs, and software. Therefore, these functional blocks can be realized in various forms by a combination of hardware and software.

The storage unit 34 stores information such as an imaging condition for imaging a transmission image of the substrate and a design of the substrate which is an inspection object. The storage unit 34 also stores a transmission image or a reconstructed image (a cross-sectional image or a pseudo cross-sectional image) of the substrate, an inspection result of an inspection unit 42 to be described later, and the like. The storage unit 34 further stores a speed at which the radiation generator driving unit 16 drives the radiation generator 22, a speed at which the substrate holding unit driving unit 18 drives the substrate holding unit 24, and a speed at which the detector driving unit 20 drives the detector 26.

The imaging processing unit 35 causes the radiation generator driving unit 16, the substrate holding unit driving unit 18, and the detector driving unit 20 to drive the radiation generator 22, the substrate holding unit 24, and the detector 26, captures a transmission image of the inspection object held by the substrate holding unit 24, and generates a reconstructed image from the transmission image. A method of imaging a transmission image and generating a reconstructed image by the imaging processing unit 35 will be described later.

The cross-sectional image generation unit 36 generates a cross-sectional image based on the plurality of transmission images acquired from the storage unit 34. This can be realized by using a known technique such as an FBP method or a maximum likelihood estimation method. When the reconstruction algorithm is different, the property of the obtained reconstructed image and the time required for reconstruction are also different. Therefore, a configuration may be adopted in which a plurality of reconstruction algorithms and parameters used in the algorithms are prepared in advance and the user is allowed to select one of them. As a result, it is possible to provide the user with a degree of freedom in selection such as giving priority to shortening of the time required for reconstruction or giving priority to good image quality even if it takes time. The generated cross-sectional image is output to the storage unit 34 and recorded in the storage unit 34.

The substrate inspection surface detection unit 38 specifies a position (cross-sectional image) where a surface to be inspected on the substrate (for example, the surface of the substrate) is projected from the plurality of cross-sectional images generated by the cross-sectional image generation unit 36. Hereinafter, the cross-sectional image showing the inspection surface of the substrate is referred to as an "inspection surface image".

Regarding the cross-sectional images generated by the cross-sectional image generation unit 36, the pseudo cross-sectional image generation unit 40 generates an image of a region of the substrate that is thicker than the cross-sectional images by stacking a predetermined number of continuous cross-sectional images. The number of cross-sectional images to be stacked is determined by the thickness of the region of the substrate on which the cross-sectional image is projected (hereinafter referred to as "slice thickness") and the slice thickness of the pseudo cross-sectional image. For example, when the slice thickness of the cross-sectional image is 50 μm and the height (for example, 500 μm) of a solder ball (hereinafter, simply referred to as "solder") of BGA is used as the slice thickness as the pseudo cross-sectional image, 500/50=10 cross-sectional images may be stacked. At this time, in order to specify the position of the solder, the inspection surface image specified by the substrate inspection surface detection unit 38 is used.

The inspection unit 42 inspects the joint state of the solder based on the cross-sectional image generated by the cross-sectional image generation unit 36, the inspection surface image specified by the substrate inspection surface detection unit 38, and the pseudo cross-sectional image generated by the pseudo cross-sectional image generation unit 40. Since the solder that joins the substrate and the component is present in the vicinity of the substrate inspection surface, it is possible to determine whether or not the solder joins the substrate and the component appropriately by inspecting the inspection surface image and the cross-sectional image showing the region on the radiation generator 22 side with respect to the inspection surface image.

As used herein, "solder joint state" refers to whether or not a substrate and a component are joined by solder to create an appropriate conductive path. The inspection of the bonding state of the solder includes a bridge inspection, a melting state inspection, and a void inspection. "Bridge" refers to an undesirable conductive path between conductors caused by solder joining. In addition, the "molten state" refers to a state of whether or not bonding between the substrate and the component is insufficient due to insufficient melting of the solder, that is, a state of whether or not so-called "floating" occurs. "Void" refers to a failure of a solder joint due to air bubbles in the solder joint. Accordingly, the inspection unit 42 includes a bridge inspection unit 44, a melt state inspection unit 46, and a void inspection unit 48.

Although the details of the operations of the bridge inspection unit 44, the melt state inspection unit 46, and the void inspection unit 48 will be described later, the bridge inspection unit 44 and the void inspection unit 48 inspect bridges and voids, respectively, based on the pseudo cross-sectional image generated by the pseudo cross-sectional image generation unit 40, and the melt state inspection unit 46 inspects the melt state of the solder based on the inspection surface image identified by the substrate inspection surface detection unit 38. The inspection results of the bridge inspection unit 44, the molten state inspection unit 46, and the void inspection unit 48 are recorded in the storage unit 34.

Figure 3:
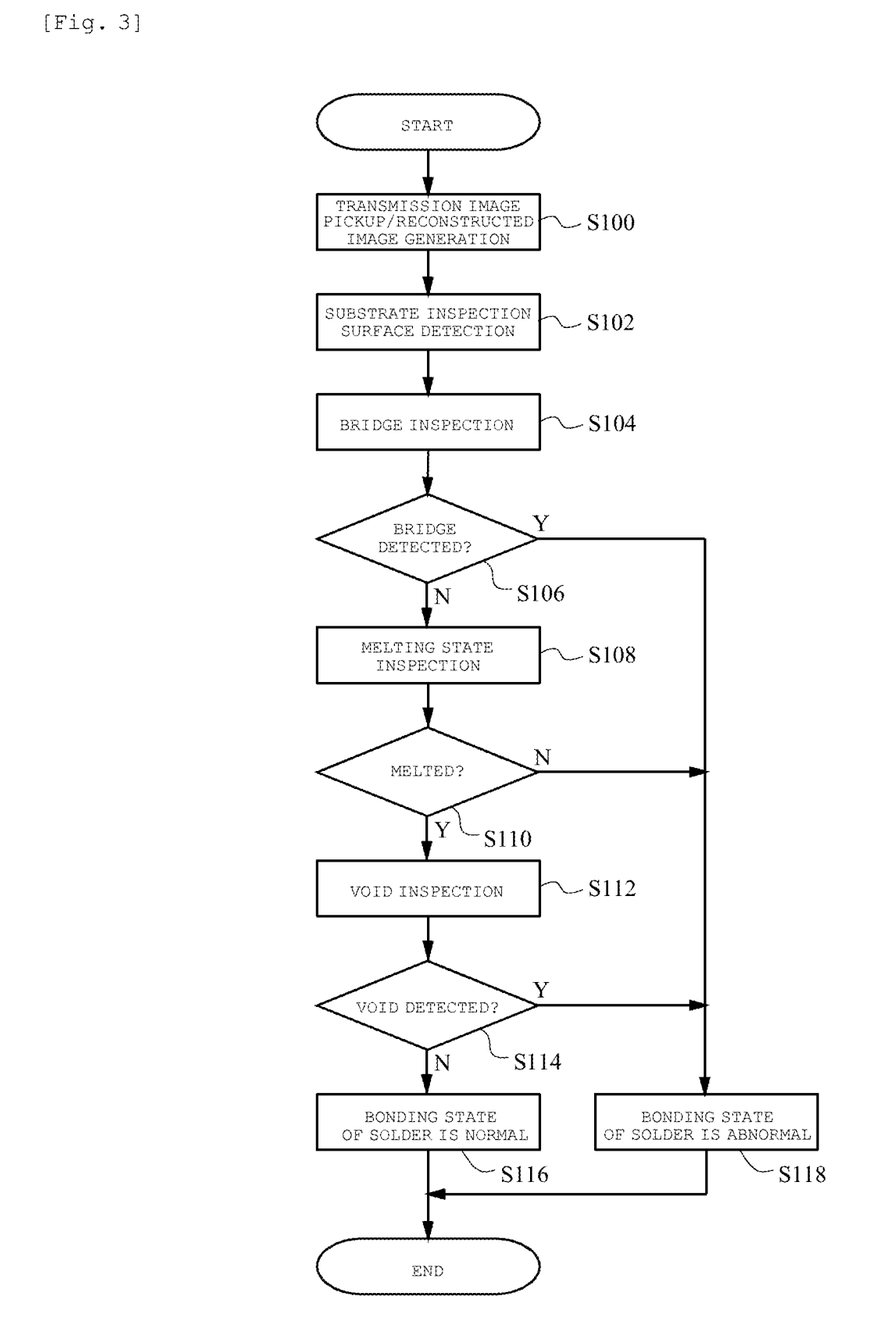
FIG. 3 is a flowchart for explaining the flow of inspection.
Figure 4:
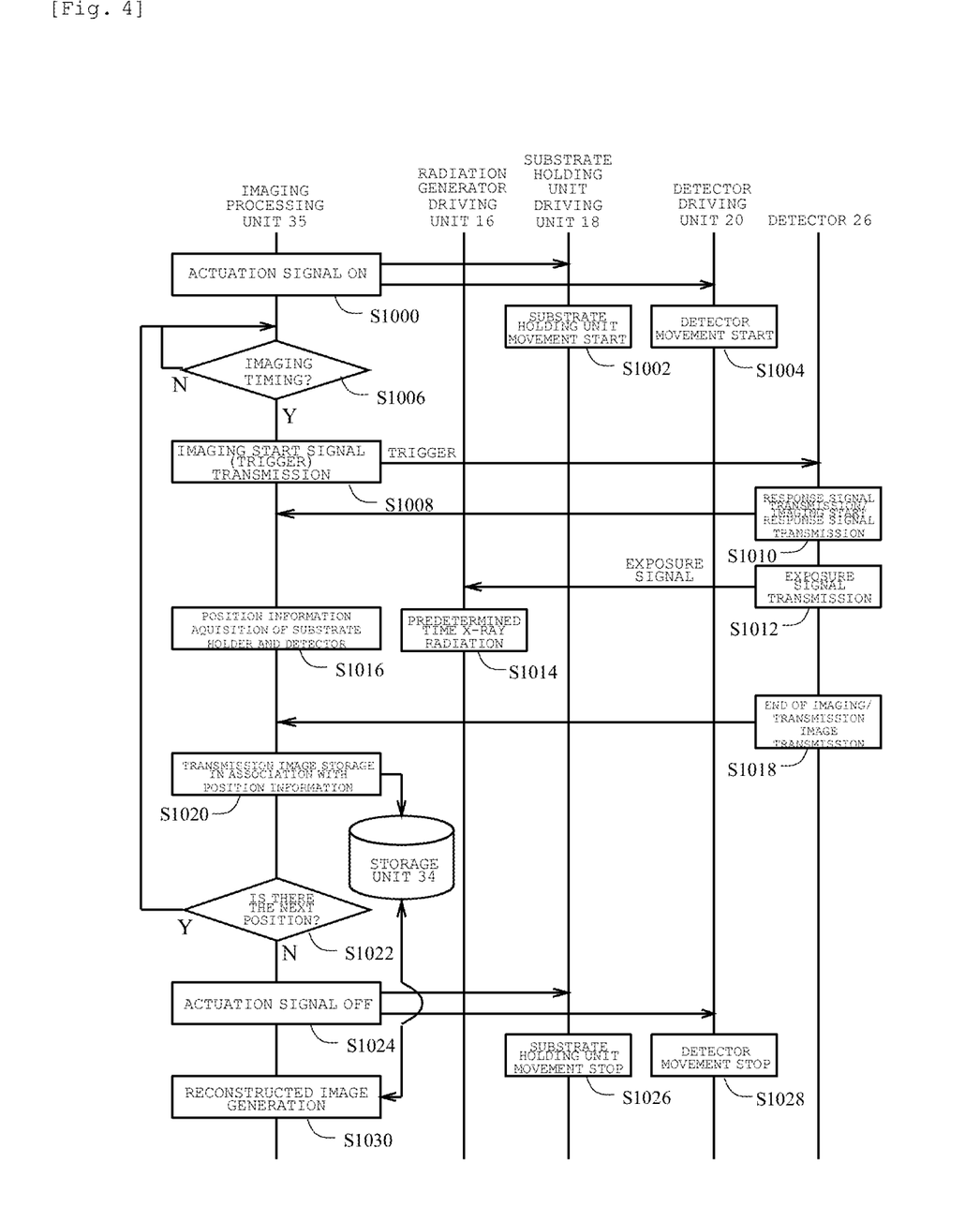
FIG. 4 is a flowchart for explaining a flow of a process of capturing a transmission image and generating a reconstructed image.

FIG. 3 is a flow chart illustrating a flow from capturing a transmission image, generating a reconstructed image, and identifying an inspection surface image to inspecting a solder joint state. FIG. 4 is a flowchart showing a flow of processing for capturing a transmission image and generating a reconstructed image. The processing in this flowchart is started, for example, when the control unit 10 receives an instruction to start inspection from an input device (not illustrated).

As shown in FIG. 3, the control unit 10 sets the irradiation field of the radiation emitted from the radiation generator 22 by the radiation generator driving unit 16, moves the substrate holding unit 24 by the substrate holding unit driving unit 18, moves the detector 26 by the detector driving unit 20 to change the imaging position, sets the radiation quality of the radiation generator 22 by the radiation quality changing unit 14, irradiates the substrate with the radiation, and captures a transmission image, and further generates a reconstructed image by the cross-sectional image generation unit 36 and the pseudo-cross-sectional image generation unit 40 from the plurality of transmission images thus captured (step S100). It is assumed that the movement path of the substrate holding unit 24 by the substrate holding unit driving unit 18 and the movement path of the detector 26 by the detector driving unit 20 when the transmission image is captured are set in advance in the substrate holding unit driving unit 18 and the detector driving unit 20 by a method of reading information stored in the storage unit 34 or a method of inputting information from an input device. It is also assumed that the position of the radiation generator 22 in the Z-axis direction is set in advance by the same method.

Figure 5A:
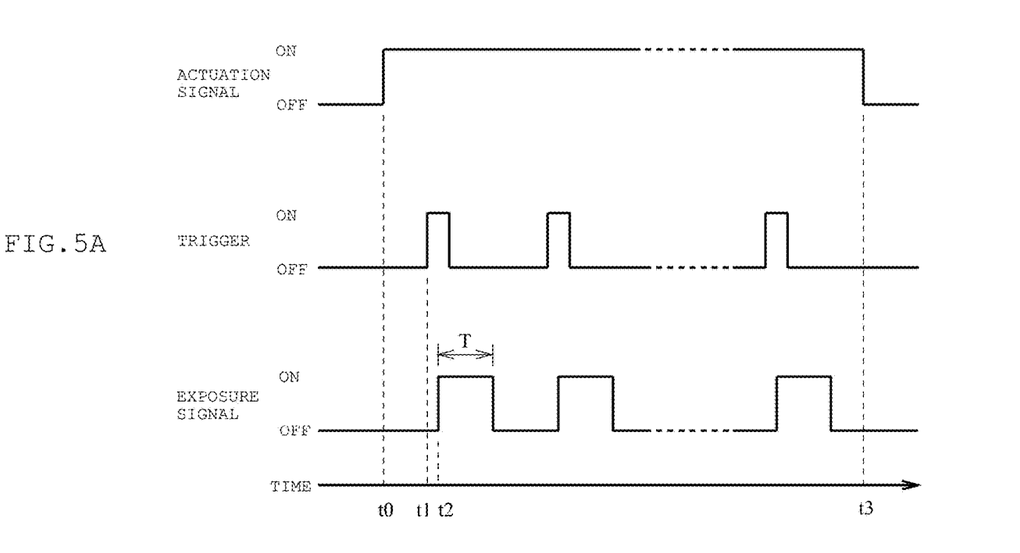
FIG. 5A shows a timing chart.

Details of the processing in step S100 will be described with reference to FIGS. 4 and 5. As shown in FIG. 4, when step S100 is started, the imaging processing unit 35 of the control unit 10 turns on the actuation signals output to the substrate holding unit driving unit 18 and the detector driving unit 20 (step S1000). This corresponds to the time t0 in FIG. 5A. When the activation signal is turned on, the substrate holding unit driving unit 18 starts moving the substrate holding unit 24 (step S1002), and the detector driving unit 20 starts moving the detector 26 (step S1004). The substrate holding unit 24 and the detector 26 are moved along a predetermined movement path as described above.

The imaging processing unit 35 determines whether or not it is imaging timing (step S1006), and when it is determined that it is not imaging timing ("N" in step S1006), repeats this step again after a predetermined time, and when it is determined that it is imaging timing ("Y" in step S1006), transmits an imaging start signal (trigger) to the detector 26 (step S1008). For example, in the example of FIG. 5A, the trigger for the detector 26 is turned on at time t1.

The detector 26 that has detected that the trigger has been turned on by the imaging processing unit 35 starts imaging of a transmission image and transmits a response signal indicating that imaging has been started to the imaging processing unit 35 (step S1010). Further, the detector 26 transmits an exposure signal to the radiation generator driving unit 16 (step S1012). For example, in the example of FIG. 5A, the exposure signal output to the radiation generator driving unit 16 is turned on during a period of time T from time t2. In this manner, when the exposure signal is transmitted from the detector 26 to the radiation generator driving unit 16, the delay from the start of imaging to the start of exposure can be made extremely small.

Figure 5B:
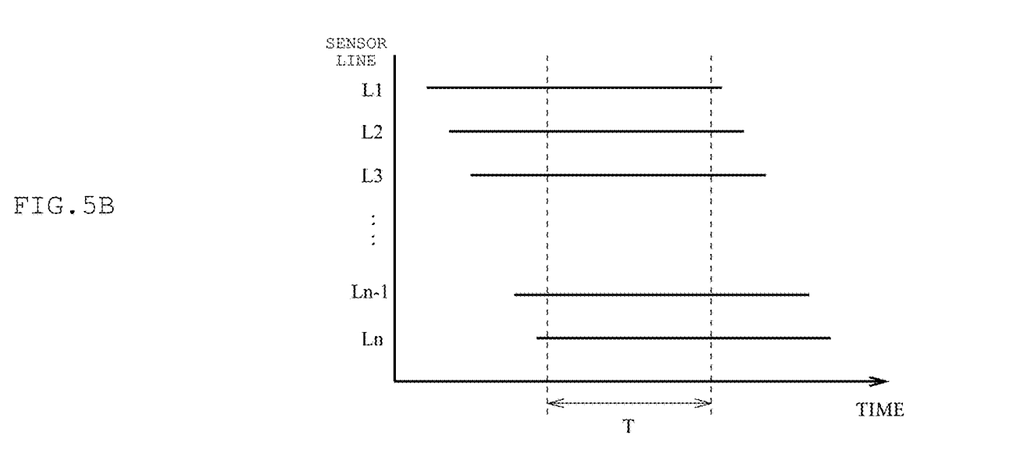
FIG. 5B shows the timing of exposure.

Upon receiving the exposure signal from the detector 26, the radiation generator driving unit 16 causes the radiation generator 22 to generate radiation while the exposure signal is ON, and the radiation is irradiated onto the inspection object (step S1014). Here, in a case where the detector 26 adopts the rolling shutter one way type, information (intensity or the like) of radiation detected by the light receiving elements of the detector 26 is acquired along a plurality of scan lines arranged in a predetermined direction, but the start time is shifted for each scan line. For example, as shown in FIG. 5B, when the detector 26 includes n scanning lines extending in the left-right direction, pieces of information detected at different start times are acquired in the order of L1, L2, L3, ., Ln−1, and Ln from the top. Therefore, by generating radiation from the radiation generator 22 during the time when all the scan lines acquire data (during the time T in the case of FIG. 5B), the information obtained from each scan line becomes information by radiation irradiated at the same time, so that distortion of the acquired transmission image can be prevented.

The imaging processing unit 35 which has received the response signal transmitted from the detector 26 acquires the position information of the substrate holding unit 24 from the substrate position detection unit 29, acquires the position of the detector 26 from the detector position detection unit 31, and stores the acquired position information (step S1016). Since the movement of the substrate holding unit 24 by the substrate holding unit driving unit 18 and the movement of the detector 26 by the detector driving unit 20 are controlled along the predetermined movement path as described above, if one of the positions of the substrate holding unit 24 and the detector 26 is known, the other position is also known. The positions of the substrate holding unit 24 and the detector 26 may be stored in the XY orthogonal coordinate system (in the form of positions (x, y) in the X-axis direction and the Y-axis direction) or may be stored in a polar coordinate system (in the form of positions (r, θ) specified by distances from the origin and angles θ) with the centers of the orbital planes of the substrate rotation trajectory 28 and the detector rotation trajectory 30 as origins.

When the imaging of the transmission image is completed as described above, the detector 26 transmits the captured transmission image to the imaging processing unit 35 (step S1018). Then, the imaging processing unit 35 that has acquired the transmission image associates the position information of the substrate holding unit 24 and the position information of the detector 26 acquired in step S1016 with the acquired transmission image, and stores them in the storage unit 34 (step S1020).

The imaging processing unit 35 determines whether or not there is a next imaging position (step S1022), and when it is determined that there is a next imaging position ("Y" in step S1022), returns to step S1006 and repeats the above-described processing (steps S1006 to S1020). On the other hand, when the imaging processing unit 35 determines that there is no next imaging position ("N" in step S1022), the imaging processing unit 35 turns off the actuation signals output to the substrate holding unit driving unit 18 and the detector driving unit 20 (step S1024), and the substrate holding unit driving unit 18 detects that the actuation signals are turned off stops the movement of the substrate holding unit 24 (step S1026) and the detector driving unit 20 stops the movement of the detector 26 (step S1028). For example, this corresponds to the time t3 in FIG. 5A.

Finally, the imaging processing unit 35 generates a reconstructed image from the transmission images stored in the storage unit 34 by the cross-sectional image generation unit 36 and the pseudo cross-sectional image generation unit 40 (step S1030). The generated reconstructed image may be stored in the storage unit 34.

Next, returning to FIG. 3, the substrate inspection surface detection unit 38 of the control unit 10 receives the transmission image or the reconstructed image (cross-sectional image) from the cross-sectional image generation unit 36, and specifies an inspection surface image from the transmission image or the reconstructed image (cross-sectional image) (step S102). The bridge inspection unit 44 acquires a pseudo cross-sectional image showing the solder ball from the pseudo cross-sectional image generation unit 40, and inspects whether or not there is a bridge (step S104). When no bridge is detected ("N" in step S106), the melting state inspection unit 46 acquires the pseudo cross-sectional image showing the solder ball from the pseudo cross-sectional image generation unit 40, and inspects whether or not the solder is melted (step S108). If the solder is melted ("Y" in step S110), the void inspection unit 48 acquires a pseudo cross-sectional image partially projecting the solder ball from the pseudo cross-sectional image generation unit 40 to inspect whether or not a void exists (step S112). When no void is found ("N" in step S114), the void inspection unit 48 determines that the bonding state of the solder is normal (step S116), and outputs the determination result to the storage unit 34. When a bridge is detected ("Y" in step S106), when the solder is not melted ("N" in step S110), or when a void exists ("Y" in step S114), the bridge inspection unit 44, the melting state inspection unit 46, and the void inspection unit 48 determine that the bonding state of the solder is abnormal (step S118), and outputs the determination result to the storage unit 34. When the state of the solder is output to the storage unit 34, the process in this flowchart ends.

According to the above-described method, the position at which the transmission image is captured is not information on the time at which the imaging processing unit 35 transmits the trigger to the detector 26, but information on the time at which the detector 26 starts acquiring the image (time at which the response signal is received from the detector 26). In a state in which the relative positions of the radiation generator 22, the substrate holding unit 24 and the detector 26 are being changed (a state in which the substrate holding unit 24 and the detector 26 continue to move), a delay occurs between the transmission of the trigger by the imaging processing unit 35 and the start of the acquisition of an image by the detector 26, so that there is a possibility that the positions of the substrate holding unit 24 and the detector 26 at the time when the trigger is transmitted are shifted from the positions at which the transmitted image is actually taken. Therefore, as described above, when the detector 26 starts acquiring an image and the imaging processing unit 35 receives a response signal transmitted from the detector 26 at that time, accurate position information can be acquired by acquiring the positions of the substrate holding unit 24 and the detector 26, and thus the accuracy of a reconstructed image can be improved. In addition, the movement path of the substrate holding unit 24 by the substrate holding unit driving unit 18 and the movement path of the detector 26 by the detector driving unit 20 may deviate from pre-designated positions due to the characteristics of the driving units, but as described above, these positions are positions detected by the substrate position detecting unit 29 and the detector position detecting unit 31, so that accurate position information can be acquired and the accuracy of the reconstructed image can be further improved.

The position information of the substrate holding unit 24 and the detector 26 and the transmission image can be efficiently used in a storage area (memory, hard disk, or the like) of the control unit 10 by adopting a method of storing the information by cyclically using a predetermined area (a method of sequentially storing information from the head of the predetermined area and returning to the head of the predetermined area when the information is stored at the end of the predetermined area).

When the detector 26 captures a transmission image by the rolling shutter method, if the transmission image is acquired while the relative positions of the radiation generator 22, the substrate holding unit 24, and the detector 26 are changed, the image may be distorted. However, as described above, by synchronizing ON/OFF of X-rays emitted from the radiation generator 22 (ON/OFF of an exposure signal) with a signal (response signal) of the rolling shutter of the detector 26, a transmission image without distortion can be acquired.

The invention claimed is:

1. An inspection device comprising:
   a radiation source;
   a holding unit that holds an inspection object;
   a detector that detects a radiation radiated from the radiation source and passing through the inspection object to acquire an image of the inspection object;
   a driving unit that changes relative positions between the radiation source, and the holding unit and the detector;
   a position detection unit that detects information regarding positions of the holding unit and the detector; and
   a control unit,
   at each of a plurality of imaging timings in a state where the relative positions between the radiation source, and the holding unit and the detector are changed by the driving unit, the inspection device executing:
   a step of the control unit transmitting an imaging start signal for causing the detector to start acquisition of the image;
   a step of the detector receiving the imaging start signal and starting acquisition of the image and transmitting a response signal indicating start of imaging to the control unit;
   a step of the control unit receiving the response signal and acquiring information regarding the positions of the holding unit and the detector from the position detection unit; and
   a step of the control unit storing the image acquired by the detector and the information regarding the positions in association with each other.

2. An inspection device comprising:
   a radiation source;
   a holding unit that holds an inspection object;
   a detector that detects a radiation radiated from the radiation source and passing through the inspection object to acquire an image of the inspection object;
   a driving unit that changes relative positions between the radiation source, and the holding unit and the detector;
   a position detection unit that detects information regarding positions of the holding unit and the detector; and
   a control unit,
   at each of a plurality of imaging timings in a state where the relative positions of the radiation source, and the holding unit and the detector are changed by the driving unit, the inspection device executing:
   a step of the control unit transmitting an imaging start signal for causing the detector to start acquisition of the image;
   a step of the detector receiving the imaging start signal and starting acquisition of the image and transmitting a response signal indicating start of imaging to the control unit;
   a step of the control unit receiving the response signal and acquiring information regarding the positions of the holding unit and the detector from the position detection unit; and
   a step of the control unit storing the image acquired by the detector and the information regarding the positions in association with each other,
   wherein the detector causes the radiation to be radiated from the radiation source during a predetermined period that is at least part of a period during which the image is acquired.

3. The inspection device according to claim 2, wherein the detector is a rolling shutter one way detector, and the predetermined period is a period in which all the scan lines acquire detected information.

4. The inspection device according to claim 2, wherein after the step of transmitting the response signal, the detector transmits an exposure signal to the radiation source, and the radiation source that has received the exposure signal radiates the radiation.

* * * * *